US007917988B2

(12) United States Patent
Gillott et al.

(10) Patent No.: US 7,917,988 B2
(45) Date of Patent: Apr. 5, 2011

(54) APPARATUS AND A METHOD OF APPLYING A DRY FILM LUBRICANT TO A ROTOR SLOT

(75) Inventors: Shaun Gillott, Alfreton (GB); William A Griffiths, Alfreton (GB)

(73) Assignee: Rolls-Royce plc, London (GB)

( * ) Notice: Subject to any disclaimer, the term of this patent is extended or adjusted under 35 U.S.C. 154(b) by 1157 days.

(21) Appl. No.: 11/395,131

(22) Filed: Apr. 3, 2006

(65) Prior Publication Data

US 2006/0219483 A1 Oct. 5, 2006

Related U.S. Application Data

(63) Continuation of application No. PCT/GB2004/004185, filed on Oct. 1, 2004.

(30) Foreign Application Priority Data

Oct. 23, 2003 (GB) .................................. 0324704.6

(51) Int. Cl.
*A47L 13/16* (2006.01)
*F16N 1/00* (2006.01)

(52) U.S. Cl. ..................... 15/244.1; 15/210.1; 15/248.1; 184/102

(58) Field of Classification Search ................. 15/210.1, 15/244.1, 244.2, 244.3, 248.1; 184/102
See application file for complete search history.

(56) References Cited

U.S. PATENT DOCUMENTS 2,820,237 A * 1/1958 Maslaney ..................... 15/248.1
2,998,614 A * 9/1961 Winch ......................... 15/210.1
3,058,139 A * 10/1962 Dryden ........................ 15/244.1
3,098,253 A * 7/1963 Harrison ......................... 15/118
3,105,263 A * 10/1963 Ginter .......................... 15/244.1
3,114,924 A * 12/1963 Morrison ....................... 15/97.1
3,536,160 A * 10/1970 Brewer ......................... 184/109
4,134,173 A 1/1979 Cupp
4,594,015 A 6/1986 Pomares
4,609,301 A * 9/1986 Benarrouch .................. 401/196
4,856,136 A * 8/1989 Janssen ........................ 15/244.3
4,934,011 A * 6/1990 Haug ............................. 15/145

(Continued)

FOREIGN PATENT DOCUMENTS

EP 0 496 503 A 7/1992

(Continued)

*Primary Examiner* — Randall Chin

(74) *Attorney, Agent, or Firm* — Jeffrey S. Melcher; Manelli Denison & Selter PLLC

(57) ABSTRACT

An apparatus (60) for applying a dry film lubricant comprises a tool (62) and a pad (64). The tool (62) includes a handle (66), a cranked member (68) and a supporting member (70). The pad (64) is removably locatable on the supporting member (70). The supporting member (70) is oval in cross-section and the pad (64) includes an oval cross-section hollow member removably locatable on the supporting member (70). The supporting member (70) comprises locking means (78) to lock the pad (64) on the supporting member (70). The supporting member (70) comprises positioning means (80) to position the pad (64) on the supporting member (70). The tool (62) also has a shielding member (72) spaced from and arranged parallel to the supporting member (70). The handle (66) is arranged in a plane (A) substantially parallel to a plane (B) containing the supporting member (70) and to a plane (C) containing the shielding member (72). The pad (64) is substantially dovetail shape in cross-section to correspond to a rotor slot (40).

28 Claims, 3 Drawing Sheets

U.S. PATENT DOCUMENTS 5,323,506 A * 6/1994 Babitch .......................... 15/210.1
D354,626 S * 1/1995 Hurwitz .......................... D4/116
5,596,786 A * 1/1997 Kluiters .......................... 15/119.2
5,774,925 A * 7/1998 Pryor, III .......................... 15/244.1
6,010,268 A * 1/2000 Sereg et al. .......................... 401/207
6,470,526 B2 * 10/2002 Large .......................... 15/244.1
6,601,264 B1 * 8/2003 Hendricks .......................... 15/244.1
2003/0005536 A1 1/2003 Kim

FOREIGN PATENT DOCUMENTS

GB 1 181 230 SP 2/1970
GB 2 298 379 A 9/1996

* cited by examiner

APPARATUS AND A METHOD OF APPLYING A DRY FILM LUBRICANT TO A ROTOR SLOT

CROSS-REFERENCE TO RELATED APPLICATIONS

This application is a continuation of International Application No. PCT/GB2004/004185, filed 1 Oct. 2004 designating the United States, which claims priority to GB 0324704.6, filed 23 Oct. 2003.

BACKGROUND OF THE INVENTION

The present invention relates to an apparatus and a method of applying a dry film lubricant to a rotor slot and in particular to an apparatus and method of applying a dry film lubricant to a compressor rotor slot or a fan disc slot of a gas turbine engine.

Currently dry film lubricant is applied to compressor rotor slots, or fan disc slots, of gas turbine engines in order to reduce wear between the compressor rotor and the compressor blade or between the fan rotor and the fan blade to reduce the possibility of failure of the compressor blade or fan blade. The dry film lubricant is applied to the compressor rotor slots or the fan rotor slots during the building of the gas turbine engines or alternatively during overhaul of the gas turbine engine.

The dry film lubricant is applied to the rotor slot by spraying the dry film lubricant as an aerosol from nozzles arranged to direct the dry film lubricant onto the appropriate surfaces of the rotor slot. This method requires the use of special facilities, such as humidity and temperature controlled booths and ovens to stove the dry film lubricant.

It is not possible to re-lubricate the rotor slots while the gas turbine engine is in service without returning the gas turbine engine to an overhaul base.

SUMMARY OF THE INVENTION

Accordingly the present invention seeks to provide a novel apparatus and method of applying a dry film lubricant to a rotor slot.

Accordingly the present invention provides an apparatus for applying a dry film lubricant to a rotor slot comprising a tool and a pad, the tool including a handle and a supporting member, the pad is removably locatable on the supporting member, the pad including a hollow member removably locatable on the supporting member, the supporting member and the hollow member having matching cross-sectional shapes to prevent relative rotation, and the pad having the same cross-sectional shape as the rotor slot.

Preferably the supporting member is oval in cross-section and the pad includes an oval cross-section hollow member removably locatable on the supporting member.

Preferably the supporting member comprises locking means to lock the pad on the supporting member.

Preferably the supporting member comprises positioning means to position the pad on the supporting member.

Preferably the positioning means comprises at least one positioning member extending laterally from the supporting member.

Preferably the positioning member extends around the periphery of the supporting member.

Preferably the supporting member of the tool has an end remote from the handle and the end of the supporting member has two prongs biased apart to grip the hollow member of the pad.

Preferably the locking means comprises at least one lug at an end of at least one prong remote from the handle, the at least one lug extending laterally away from the supporting member to lock the pad on the supporting member.

Preferably the locking means comprises at least one lug at the ends of both of the prongs remote from the handle, the lugs extending laterally away from the supporting member to lock the pad on the supporting member.

Preferably the tool has a shielding member spaced from and arranged parallel to the supporting member.

Preferably the tool is cranked such that the handle is arranged in a plane substantially parallel to a plane containing the supporting member and to a plane containing the shielding member.

Preferably the pad is substantially dovetail shape in cross-section.

Preferably the edge of the pad is chamfered.

Preferably the pad comprises a moulded solvent resistant foam.

Preferably the pad comprises a lubricant absorbant coating.

The present invention also comprises a method of applying a dry film lubricant to a rotor slot comprising removing the rotor blade from the rotor slot, applying the dry film lubricant to the rotor slot using a tool and a pad, the tool including a handle and a supporting member, the pad is removably locatable on the supporting member, the pad including a hollow member removably locatable on the supporting member, the supporting member and the hollow member having matching cross-sectional shapes to prevent relative rotation, and the pad having the same cross-sectional shape as the rotor slot.

Preferably the method comprises cleaning and degreasing the rotor slot before applying the dry film lubricant.

Preferably the method comprises allowing the dry film lubricant to cure before inserting the rotor blade into the rotor slot.

Preferably the method comprising curing the dry film lubricant at ambient temperature for at least 1 hour.

BRIEF DESCRIPTION OF THE DRAWINGS

The present invention will be more fully described by way of example with reference to the accompanying drawings in which:—

DETAILED DESCRIPTION OF THE INVENTION

Figure 1:
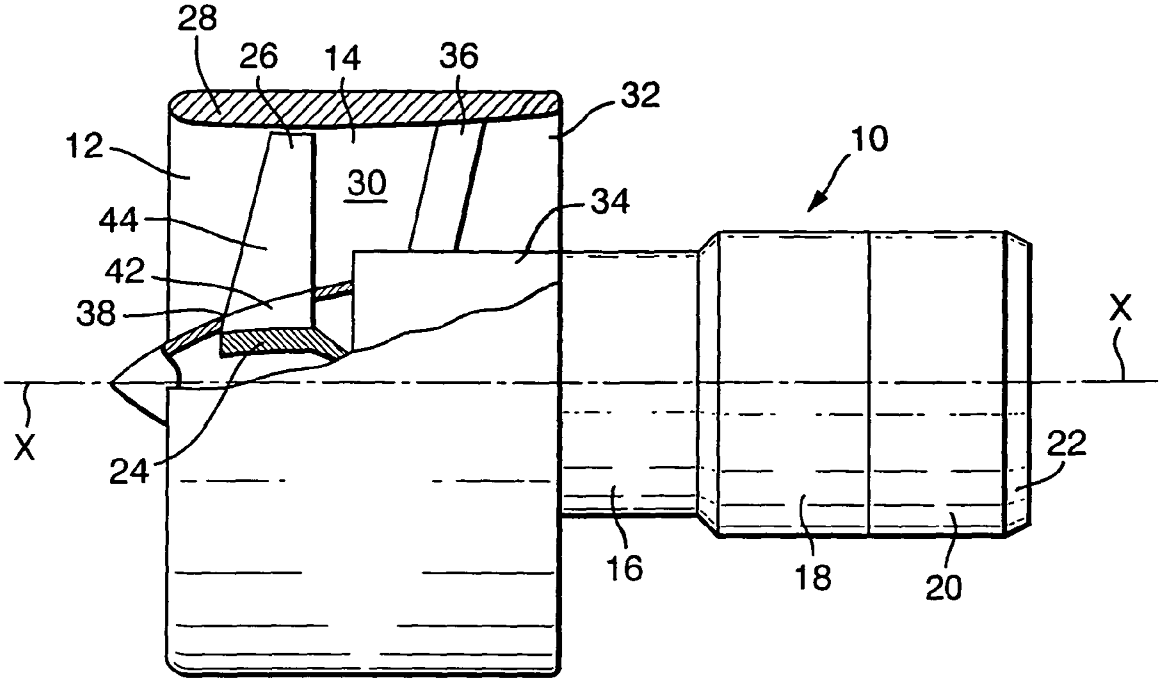
FIG. 1 is a partially cut away view of a turbofan gas turbine engine having a rotor slot provided with a dry film lubricant according to the present invention.

A turbofan gas turbine engine 10, as shown in FIG. 1, comprises in flow series an intake 12, a fan section 14, a compressor section 16, a combustion section 18, a turbine section 20 and an exhaust 22. The turbine section 20 comprises one or more turbines (not shown) arranged to drive one or more compressors (not shown) in the compressor section 16 via shafts (not shown). The turbine section 20 also comprises one or more turbines (not shown) arranged to drive the fan section 14 via a shaft (not shown). The turbofan gas turbine engine 10 operates quite conventionally and its operation will not be discussed further.

The fan section 14 comprises a fan rotor 24, which carries a plurality of circumferentially spaced radially outwardly extending fan blades 26. The fan rotor 24 and fan blades 26 are surrounded by a fan casing 28, which is arranged substantially coaxially with the fan rotor 24 and fan blades 26. The fan casing 28 partially defines a fan duct 30 and the fan duct 30 has an outlet 32 at its axially downstream end. The fan casing 28 is secured to a core engine casing 34 by a plurality of radially extending fan outlet guide vanes 36, which are secured to the fan casing 28 and the core engine casing 34. The fan rotor 24 and fan blades 26 rotate about an axis X of the turbofan gas turbine engine 10.

Figure 2:
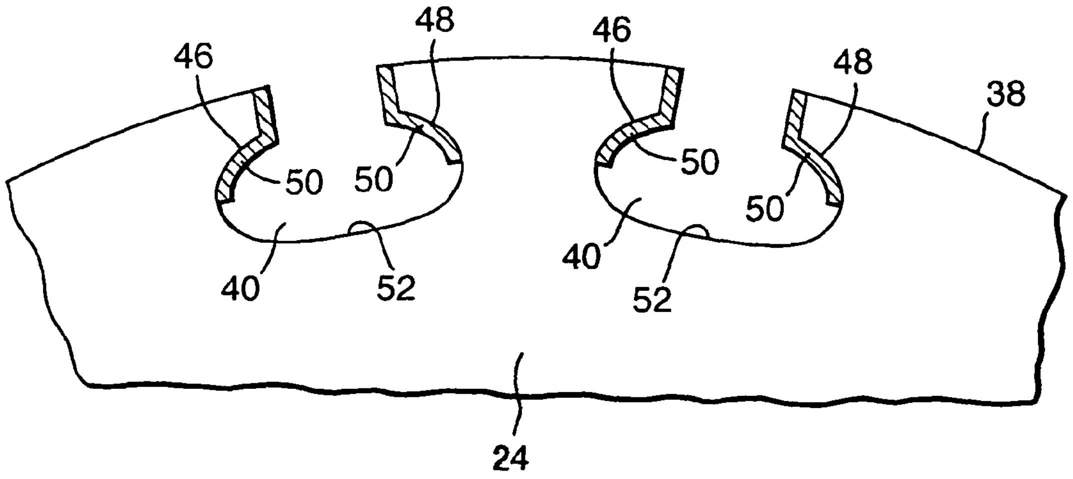
FIG. 2 is an enlarged end view of part of the fan rotor shown in FIG. 1.

The radially outer periphery 38 of the fan rotor 24 comprises a plurality of circumferentially spaced axially extending fan rotor slots 40 and the fan rotor slots 40 are substantially dovetail shape in cross-section, as shown in FIG. 2. Each of the fan blades 26 comprises a root portion 42 and an aerofoil portion 44 and the root portion 42 of each fan blade 26 is substantially dovetail shape in cross-section corresponding to the dovetail shape of the fan rotor slots 40. The root portion 42 of each of the fan blades 26 locates in a respective one of the fan rotor slots 40.

Each fan rotor slot 40 is provided with a dry film lubricant 50 on the areas 46 and 48 on the angled convergent flanks of the fan rotor slot 40 but not on the area 52 on the base of the fan rotor slot 40, as shown in FIG. 2. The dry film lubricant 50 minimises the wear between the fan rotor 24 and the fan blade 26 to reduce the possibility of failure of the fan blade 26. The areas 46 and 48 are the areas of the fan rotor slot 40 of the fan rotor 24 upon which the angled convergent flanks of the root portions 42 of the fan blades 26 contact and exert load during operation of the turbofan gas turbine engine 10.

Figure 3:
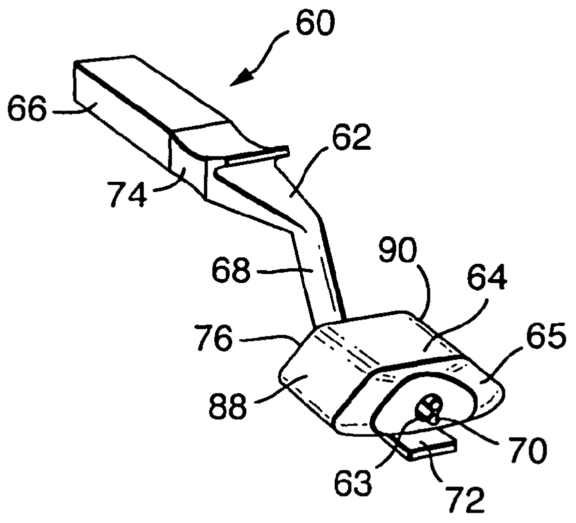
FIG. 3 is a perspective view of an apparatus for applying a dry film lubricant to a rotor slot according to the present invention.
Figure 4:
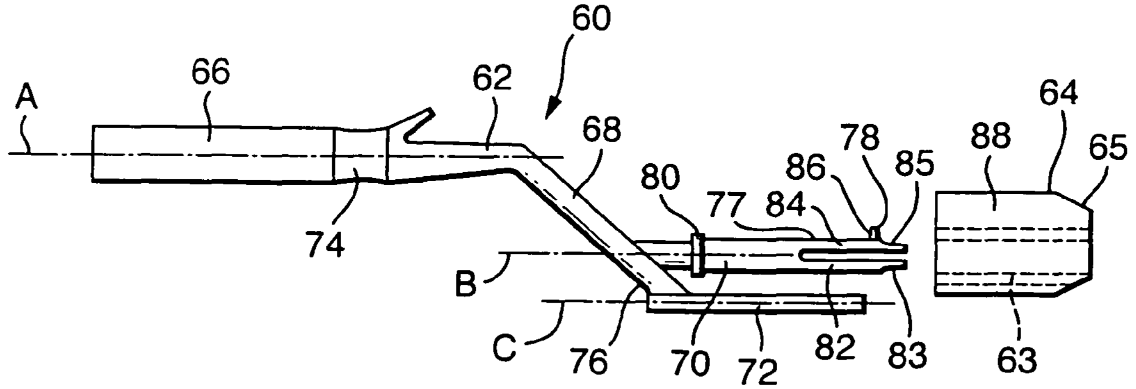
FIG. 4 is an exploded side view of the apparatus shown in FIG. 3.
Figure 5:
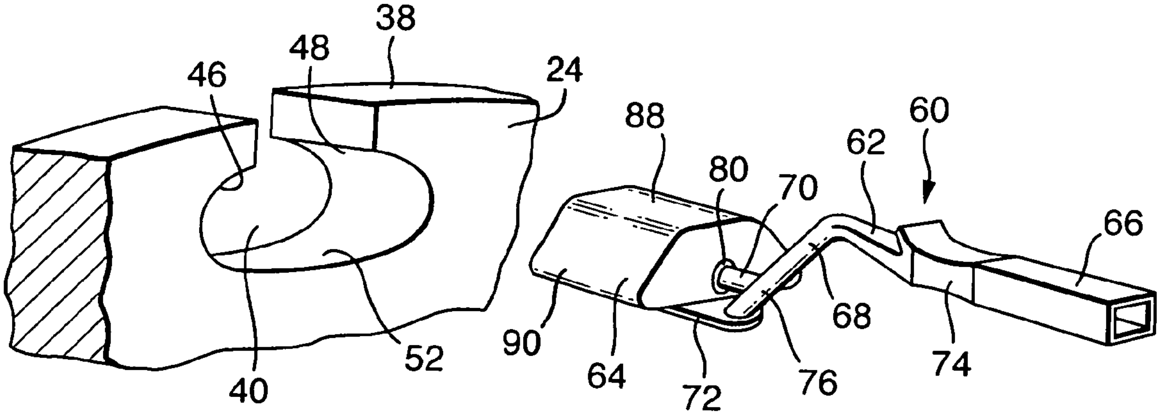
FIG. 5 is a perspective view showing the apparatus shown in FIGS. 3 and 4 applying a dry film lubricant to a fan rotor slot.

An apparatus 60 for applying a dry film lubricant to the fan rotor slots 40, is shown in FIGS. 3 to 5. The apparatus 60 comprises a tool 62 and a pad 64. The tool 62 includes a handle 66, a cranked member 68, a supporting member 70 and a shielding member 72. The handle 66 is arranged at a first end 74 of the cranked member 68 and the supporting member 70 and shielding member 72 are arranged at the second end 76 of the cranked member 68. The pad 64 is removably locatable on the supporting member 70.

The supporting member 70 is substantially oval in cross-section and the pad 64 includes an oval cross-section hollow member 63, or aperture, which extends completely through the pad 64. The pad 64 is removably locatable on the supporting member 70 by insertion of the supporting member 70 into the hollow member 63. The supporting member 70 comprises locking means 78 to lock the pad 64 on the supporting member 70 of the tool 62. The supporting member 70 comprises positioning means 80 to position the pad 64 on the supporting member 70. The positioning means 80 comprises at least one positioning member 82 extending laterally from the supporting member 70 and extending around the oval periphery of the supporting member 70.

An end 77 of the supporting member 70 remote from the handle 66 and cranked arm 68 has two oval cross-section prongs 82 and 84, which are biased apart to grip the hollow member of the pad 64. The locking means 78 comprises a lug 86 at an end 85 of the prong 84 remote from the handle 66 and cranked arm 68, the at least one lug extending laterally away from the supporting member 70 to lock the pad 64 on the supporting member 70. The ends 83 and 85 of the at least one member 82 and prong 84 respectively are of reduced cross-sectional area.

The tool 62 is provided with a cranked arm 68 such that the handle 66 is arranged in a plane A substantially parallel to a plane B containing the supporting member 70 and to a plane C containing the shielding member 72. The tool 62 is moulded from a material, for example fibre reinforced nylon, which does not cause damage to the fan rotor 24 should the tool 62 contact the fan rotor 24.

The pad 64 is substantially dovetail shape in cross-section and the edges 65 of the pad 64 remote from the handle 66 and cranked arm 68 are chamfered. The pad 64 is formed from a moulded resilient solvent resistant reticulated foam and as mentioned before has a substantially oval cross-section hollow member 63 in its interior around which the foam is injection moulded and firmly bonded. The pad 64 has convergent surfaces 88 and 90 arranged at substantially the same angle as the areas 46 and 48 of the fan rotor slot 40 and the surfaces 88 and 90 are arranged with the same distances between them as the distance between the areas 46 and 48. The depth of the pad 64 is less than the radial depth of the fan rotor slot 40 such that the pad 64 may be inserted into the fan rotor slot 40 without the base of the pad 64 contacting the area 52 on the base of the fan rotor slot 40. The pad 64 also comprises a lubricant absorbant flocking material on the surfaces 88 and 90 and the flocking material comprises a layer of fine fibres, similar to moleskin in texture and finish, and the fine fibres give good paint holding properties and produce a smooth even coating.

A pad 64 is placed on the supporting member 70 of the tool 62 by firstly squeezing the ends 83 and 85 of the prongs 82 and 84 respectively together against the resilience of the supporting member 70 and then sliding the hollow oval cross-section member of the pad 64 along the oval cross-section supporting member 70 until the pad 64 abuts the positioning member 80 at which position the pad 64 is in the correct position on the supporting member 70. The ends 83 and 85 of the prongs 82 and 84 respectively are then biased apart by the resilience of the material of the tool 62 such that the lug 86 of the locking means 78 on the supporting member 70 abuts the end of the pad 64 to retain the pad 64 in the correct position on the supporting member 70.

A pad 64 is removed from the supporting member 70 of the tool 62 by squeezing the ends 83 and 85 of the prongs 82 and 84 respectively together against the resilience of the supporting member 70 such that the lug 86 of the locking means 78 on the supporting member 70 no longer abuts the end of the pad 64 to retain the pad 64 in the correct position on the supporting member 70.
The hollow oval cross-section member 63 of the pad 64 is then slid along the oval cross-section supporting member 70 until the pad 64 has been completely removed from supporting member 70.

The oval cross-section supporting member 70 and the hollow oval cross-section member 63 are designed to prevent rotation of the pad 64 around the supporting member 70.

The apparatus 60 allows a dry film lubricant to be applied to the fan rotor slots 40 while the turbofan gas turbine engine 10 is in service without returning the turbofan gas turbine engine 10 to an overhaul base.

In order to apply a dry film lubricant the fan blades 26 are removed from the fan rotor 24. Then one or more of the fan rotor slots 40 are cleaned in order to remove loose debris from the fan rotor slots 40. Each fan rotor slot 40 is cleaned using the tool 60 by inserting a dry cleaning pad 64 within the fan rotor slot 40 and by moving the tool 60 backwards and forwards axially along the fan rotor slot 40 while ensuring the surfaces 88 and 90 of the pad 64 abuts the areas 46 and 48 of the fan rotor slot 40.

Then one or more of the fan rotor slots 40 is degreased using the tool 60 by inserting a cleaning pad containing a suitable solvent, for example acetone, isopropyl alcohol, methyl ethyl ketone, Stoddard solvent etc, to remove grease within the fan rotor slot 40 and by moving the tool 60 backwards and forwards axially along the fan rotor slot 40 while ensuring the surfaces 88 and 90 of the pad 64 abuts the areas 46 and 48 of the fan rotor slot 40.

The fan rotor slots 40 are allowed sufficient time for all the solvent to evaporate such that the areas 46 and 48 are dry.

Then a suitable dry film lubricant is applied to one or more of the fan rotor slots 40 using the tool 60 by inserting a paint applicator pad 64 containing dry film lubricant paint, for example molybdenum disulphide or graphite e.g. Molycote (Trade Mark of Dow Corning), Molydag (Trade Mark of Achesson) Lubelock (Trade Mark), within the fan rotor slot 40 and by moving the tool 60 backwards and forwards axially along the fan rotor slot 40 while ensuring the surfaces 88 and 90 of the pad 64 abuts the areas 46 and 48 of the fan rotor slot 40, as shown in FIG. 5. Preferably all of the areas 46 and 48 are covered with the dry film lubricant. The fan rotor 24 may be rotated to allow easier access to some of the fan rotor slots 40. The resilience of the pad 64 has sufficient flexibility and deformation to provide sufficient pressure to aid application of the dry film lubricant paint.

When all the fan rotor slots 40 have been coated with dry film lubricant paint the dry film lubricant is allowed to cure at ambient temperature for about 1 hour and then the fan blades 26 are reinserted in the fan rotor slots 40.

The cranked arm 68 of the tool 62 enables the tool 62 to be easily moved to and fro axially along the fan rotor slot 40. In use the shielding member 72 forms a shield between the pad 64 and the area 52 of the fan rotor slot 40 to prevent dry film lubricant paint from being applied to the area 52 of the fan rotor slot 40. The width of the shielding member 72 may be selected to be substantially the width of the base of the fan rotor slot 40 or any suitable width.

Different pads, but of the same general cross-sectional shape and with the same general construction of hollow oval cross-sectional tube and injection moulded foam, are used with the tool to clean the rotor slot, to degrease the rotor slot and to apply the dry film lubricant to the rotor slot.

Although the present invention has been described with reference to locking means comprises a lug at the end of one of the prongs it may be possible to provide a lug at the ends of both of the prongs.

Although the present invention has been described with reference to an oval cross-section supporting member it may be possible for supporting members with other cross-sectional shapes to be used which only allow the pad to be inserted in the correct way and in the correct orientation and to prevent rotation, for example rectangular, triangular etc.

Although the present invention has been described with reference to the application of dry film lubricant to a fan rotor slot it is equally applicable to the application of dry film lubricant to a compressor rotor slot.

Although the present invention has been described with reference to the use of a tool and pad to clean the rotor slot and the use of a tool and pad to degrease the rotor slot other suitable methods may be used.

The present invention is applicable to any rotor slot using an appropriate pad, which has substantially the same cross-sectional shape, to match the cross-sectional shape of the rotor slot and ideally the pad has substantially the same cross-sectional shape and dimensions as the root of the associated rotor blade.

The invention claimed is:

1. An apparatus for applying a dry film lubricant to a rotor slot comprising:

a tool including a handle and a supporting member, said handle being arranged at a first end of the tool and said supporting member being arranged at a second end of the tool, wherein said supporting member is secured to said handle, and wherein said handle is arranged in a first plane parallel to a second plane containing the supporting member and said supporting member extends longitudinally in a direction parallel to said handle; and a pad, said pad being removably locatable on the supporting member, and including a hollow member removably locatable on the supporting member, the supporting member and the hollow member having matching cross-sectional shapes to prevent relative rotation, wherein the pad has the same cross-sectional shape as a rotor slot, and wherein said pad is formed from a foam which is bonded to said hollow member, and wherein said hollow member extends completely through said pad.

2. An apparatus as claimed in claim 1, wherein the supporting member comprises locking means to lock the pad on the supporting member.

3. An apparatus as claimed in claim 1 wherein the tool has a shielding member spaced from and arranged parallel to the supporting member.

4. An apparatus for applying a dry film lubricant to a rotor slot comprising:

a tool including a handle and a supporting member; and a pad, said pad being removably locatable on the supporting member, and including a hollow member removably locatable on the supporting member, the supporting member and the hollow member having matching cross-sectional shapes to prevent relative rotation, wherein the pad has the same cross-sectional shape as a rotor slot, and wherein said pad is formed from a foam which is bonded to said hollow member, and wherein said hollow member extends completely through said pad, and wherein the supporting member of the tool has an end remote from the handle and the end of the supporting member has two prongs biased apart to grip the hollow member of the pad.

5. An apparatus as claimed in claim 4 wherein the supporting member is oval in cross-section and the pad includes an oval cross-section hollow member removably locatable on the supporting member.

6. An apparatus as claimed in claim 4 wherein the supporting member is rectangular or triangular in cross-section.

7. An apparatus as claimed in claim 4, wherein the supporting member comprises positioning means to position the pad on the supporting member.

8. An apparatus as claimed in claim 7 wherein the positioning means comprises at least one positioning member extending laterally from the supporting member.

9. An apparatus as claimed in claim 8 wherein the positioning member extends around the periphery of the supporting member.

10. An apparatus as claimed in claim 7, wherein the tool has a shielding member spaced from and arranged parallel to the supporting member, and the shielding member extending longitudinally to a position between the positioning means and an end of the supporting member remote from the handle.

11. An apparatus as claimed in claim 10, wherein the shielding member extending longitudinally a similar length as the supporting member.

12. An apparatus as claimed in claim 4 wherein the pad is substantially dovetail shape in cross-section.

13. An apparatus as claimed in claim 4 wherein the edge of the pad is chamfered.

14. An apparatus as claimed in claim 4 wherein the pad comprises a moulded solvent resistant foam.

15. An apparatus as claimed in claim 4 wherein the pad comprises a lubricant absorbant coating.

16. An apparatus for applying a dry film lubricant to a rotor slot comprising:

a tool including a handle and a supporting member; and a pad, said pad being removably locatable on the supporting member, and including a hollow member removably locatable on the supporting member, the supporting member and the hollow member having matching cross-sectional shapes to prevent relative rotation, wherein the pad has the same cross-sectional shape as a rotor slot, and wherein said pad is formed from a foam which is bonded to said hollow member, and wherein said hollow member extends completely through said pad, and wherein the supporting member comprises locking means to lock the pad on the supporting member wherein the locking means comprises at least one lug at an end of at least one prong remote from the handle, the at least one lug extending laterally away from the supporting member to abut an end of the pad to lock the pad on the supporting member.

17. An apparatus as claimed in claim 16 wherein the locking means comprises at least one lug at the ends of at least two prongs remote from the handle, the lugs extending laterally away from the supporting member to abut an end of the pad to lock the pad on the supporting member.

18. An apparatus as claimed in claim 16, wherein the supporting member is oval in cross-section and the pad includes an oval cross-section hollow member removably locatable on the supporting member.

19. An apparatus as claimed in claim 16, wherein the supporting member is rectangular or triangular in cross-section.

20. An apparatus as claimed in claim 16, wherein the supporting member comprises positioning means to position the pad on the supporting member.

21. An apparatus as claimed in claim 16, wherein the pad is substantially dovetail shape in cross-section.

22. An apparatus as claimed in claim 16, wherein the edge of the pad is chamfered.

23. An apparatus as claimed in claim 16, wherein the pad comprises a moulded solvent resistant foam.

24. An apparatus as claimed in claim 16, wherein the pad comprises a lubricant absorbant coating.

25. An apparatus for applying a dry film lubricant to a rotor slot comprising:

a tool including a handle and a supporting member; and a pad, said pad being removably locatable on the supporting member, and including a hollow member removably locatable on the supporting member, the supporting member and the hollow member having matching cross-sectional shapes to prevent relative rotation, wherein the pad has the same cross-sectional shape as a rotor slot, and wherein said pad is formed from a foam which is bonded to said hollow member, and wherein said hollow member extends completely through said pad, and wherein the tool has a shielding member spaced from and arranged parallel to the supporting member, and wherein the tool is cranked such that the handle is arranged in a plane substantially parallel to a plane containing the supporting member and to a plane containing the shielding member.

26. An apparatus as claimed in claim 25, wherein the tool comprises a cranked member, the handle is arranged at a first end of the cranked member, and the supporting member and the shielding member are arranged at a second end of the cranked member.

27. An apparatus as claimed in claim 25, wherein the shielding member extending longitudinally a similar length as the supporting member.

28. An apparatus for applying a dry film lubricant to a rotor slot comprising:

a tool including a handle and a supporting member; and a pad, said pad being removably locatable on the supporting member and comprising a hollow member removably locatable on the supporting member, the supporting member and the hollow member having matching cross-sectional shapes to prevent relative rotation, the pad having the same cross-sectional shape as a rotor slot, the pad being formed from a foam which is bonded to said hollow member, the hollow member extending completely through the pad, the supporting member of the tool having an end remote from the handle, the end of the supporting member having two prongs biased apart to grip the hollow member of the pad, the supporting member comprising locking means to lock the pad on the supporting member, the locking means comprising at least one lug at an end of at least one prong remote from the handle, and the at least one lug extending laterally away from the supporting member to abut an end of the hollow member of the pad to lock the pad on the supporting member.

* * * * *